Patented Jan. 25, 1949

2,459,834

UNITED STATES PATENT OFFICE 2,459,834

PROCESS OF PREPARING HYDROXY HYDROPHENANTHRENE CARBOXYLIC ACIDS AND THEIR ESTERS

Karl Miescher, Riehen, and Jules Heer and Jean René Billeter, Basel, Switzerland, assignors to Ciba Pharmaceutical Products Inc., Summit, N. J.

No Drawing. Application June 29, 1944, Serial No. 542,812. In Switzerland January 10, 1944

12 Claims. (Cl. 260—473)

It has been found that hydroxy-hydrophenanthrene-carboxylic acids or their derivatives can be obtained when 1-keto-hydrophenanthrenes which contain in the 2-position a functionally transformed carboxyl group in addition to a hydrocarbon radical and in the 7-position a free phenolic hydroxyl group or a group convertible into such, are reacted with an organo-metallic compound for the purpose of introducing a hydrocarbon radical into the 1-position, the newly formed tertiary hydroxyl group then removed directly or indirectly and, if desired, the functionally transformed carboxyl group in the 2-position and/or the substituent in the 7-position converted into a free carboxyl and hydroxyl group, respectively, and non-aromatic double or triple carbon to carbon bonds hydrogenated at any stage after the reaction with the organo-metallic compound.

Suitable starting materials for this process are, for example, 1,2,3,4-tetrahydrophenanthrene, 1,2,3,4,9,10-hexahydrophenanthrene or compounds derived from octahydrophenanthrene. These compounds contain in the 1-position a keto group and in the 2-position a hydrocarbon radical such as, for example, a methyl, ethyl, propyl or alkylene radical, and a functionally transformed carboxyl group, for instance, a nitrile or acid amide group, in particular an esterified carboxyl group, such as, for example, a carbomethoxy, carboethoxy, or carbobenzyloxy-group. In addition they have in the 7-position a free phenolic hydroxyl group or a group which is convertible into such. The latter may be, for example, a hydroxyl group etherized by methanol, ethanol, phenols, benzyl alcohols, etc. or esterified with organic or inorganic acids, a nitro or an amino group, or a halogen atom. The starting materials may, of course, possess any steric configuration and may also contain further substituents.

In order to introduce hydrocarbon radicals such as, for example, methyl, ethyl, allyl, propyl, benzyl or ethinyl radicals into the 1-position, the starting materials are allowed to react as described with the corresponding organo-metallic compounds, e. g., with organo-magnesium or organo-zinc halides, alkyl or alkinyl-alkali compounds, etc. The newly formed tertiary hydroxyl group is removed directly or indirectly from the tertiary alcohols obtained, if necessary after hydrogenation of side chain double or triple bonds. This may happen, for example, with the formation of a carbon double bond. To this end water is eliminated directly, or the hydroxyl group is first replaced by a halogen, or another ester or ether radical. Subsequently a hydroxyl group changed in this way may be eliminated by thermic decomposition or by treatment with agents which eliminate acid or alcohol. The elimination of the tertiary hydroxyl group as it is formed e. g. in the mentioned Grignard reaction, can also be effected directly, if desired, by the action of the Grignard agent at a raised temperature. The removal of the hydroxyl group or of the halogen atom can also be undertaken by reduction, e. g. with the help of hydrogen in the presence of a precious metal catalyst, or also with hydroiodic acid in the presence of glacial acetic acid. The conversion of the functionally transformed carboxyl group in 2-position and/or of the substituent in 7-position into a free carboxyl or hydroxyl group may be effected with hydrolyzing agents, especially in the case of esters or ethers. For benzyl ethers, for example, reducing agents can also be used. If both substituents in 2- and 7-position referred to above are converted into a free carboxyl or hydroxyl group, such a conversion may be effected in steps and in any desired sequence.

In order to saturate non-aromatic double or triple carbon to carbon bonds, in particular those introduced by eliminating the tertiary hydroxyl group or by allowing to react with unsaturated organo-metallic compounds, the products are hydrogenated at any stage after the reaction with the organo-metallic compound. For this purpose chemical methods such as catalytic or electrolytic hydrogenation and nascent hydrogen or biochemical methods may be used.

If an unsaturated radical has been introduced, this multiple bond as well as the double bond formed by the elimination of the tertiary hydroxyl group can be hydrogenated in two different reaction stages. Especially the multiple bond introduced with the unsaturated residue can first of all be saturated with hydrogen, the tertiary hydroxyl group then split off with formation of a double bond and the latter finally hydrogenated.

The compounds obtained having a free carboxyl group may be esterified, for example, directly with diazomethane or diazoethane or indirectly by way of the acid chloride or the alkali salts of the respective carboxylic acid.

Finally the free phenolic hydroxyl group may be esterified or etherized in a known manner. There are specially mentioned in this respect the esters of organic acids, particularly aliphatic and aromatic acids, such as, for example, acetic, propionic, butyric, palmitic, stearic and benzoic acids, sulphonic acids, polycarbonic acids or sulphonic-carboxylic acids, and finally of inorganic acids, such as sulphuric and phosphoric acids or carbonic acid and its derivatives. Amongst the ethers the glycosides may be specially mentioned.

The free carboxylic acids may be converted into carboxylic acid salts, such as, for example, the salts of alkalis, alkaline earths or ammonium. If the ester or ether radical in the 7-position contains basic groups, corresponding salts with inorganic acids and also, for example, betaine ester salts can be prepared. The salts mentioned find application particularly in aqueous solution or for depot treatment.

The products obtained by this process show surprisingly an extremely high oestrogenic effect, both by parenteral and by peroral administration.

The following examples illustrate the invention without however limiting it in any way, the parts being by weight.

*Example 1*

To a Grignard solution, prepared from 1 part of magnesium and 12 parts of ethyl bromide in 80 parts of absolute ether, 8 parts of 7-methoxy-1-oxo-2-carbomethoxy-2-methyl-1,2,3,4-tetrahydrophenanthrene of the formula

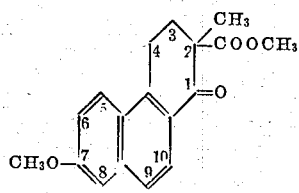

in 50 parts of absolute benzene are added as rapidly as possible. After allowing to stand for some time at room temperature, the whole is boiled for several hours under reflux. It is then cooled and decomposed in the usual way with ice-cold ammonium chloride solution. The product of the reaction is absorbed in ether, the ethereal solution washed, dried, and evaporated down. The crystalline residue is 7-methoxy-1-ethyl-1-hydroxy-2-carbomethoxy-2-methyl-1,2,3,4 - tetrahydrophenanthrene which forms, after recrystallization from alcohol, colourless needles, melting at 151–152° C.

The corresponding carboethoxy compound (M. Pt. 149–150° C.) is obtained in an exactly analogous manner.

The same compound is also obtained when 7-methoxy-1-oxo - 2 - carboethoxy - 2 - methyl-1,2,3,4-tetrahydrophenanthrene is caused to react with a solution of sodium or potassium acetylenide in liquid ammonia or tertiary amyl alcohol, and the 7-methoxy-1-ethinyl-1-hydroxy-2-carboethoxy-2-methyl-1,2,3,4 - tetrahydrophenanthrene of M. Pt. 133° C. (isomeric mixture) which is formed, catalytically hydrogenated (e. g. in alcoholic solution in the presence of platinum) until 2 mols of hydrogen have been absorbed. Two different carbinols saturated in the side-chain are formed, and are separated by fractional crystallization from alcohol. The one carbinol formed melts at 149–150° C. and is identical with the compound described in paragraph 2. The other isomer melts at 108–109° C.

One part of the tertiary alcohol, M. Pt. 151–152° C., described in paragraph 1 is boiled under reflux with 0.05 part of iodine in 20 parts of chloroform. After the elimination of water is complete, the solution is washed in a separating funnel with sodium thiosulphate solution and water, and then evaporated down. In this way 7-methoxy-1 - ethylidene - 2 - carbomethoxy - 2 - methyl-1,2,3,4-tetrahydrophenanthrene is obtained, which on recrystallization from isopropyl ether melts at 125–128° C.

A solution of 1 part of the intermediate product mentioned in 30 parts of glacial acetic acid is shaken up under hydrogen in the presence of 0.1 part of palladium-animal charcoal (10%). After the absorption of 1 mol hydrogen, the hydrogenation stops. The solution is filtered off from the catalyst and evaporated down in vacuo.

One part of the crude 7-methoxy-1-ethyl-2-carbomethoxy - 2 - methyl-1,2,3,4-tetrahydrophenanthrene obtained in this way is heated with 6 parts of potassium hydroxide and 2 parts of water to 200° C. After a short time the oil floating on the surface crystallizes. The whole is then cooled, the mass dissolved in water, a small quantity of undissolved substance extracted with ether and the aqueous alkaline solution acidified with dilute hydrochloric acid. 7-methoxy - 1-ethyl - 2-carboxy-2-methyl-1,2,3,4-tetrahydrophenathrene thereby separates out. It is recrystallized from acetone and melts in the pure state at 225–228° C. 1 part of this acid is heated for a few hours to 170–190° C. in 5 parts of pyridine hydrochloride. After cooling, water is added and the slightly coloured product which separates out dissolved in ether. The ethereal solution is first washed with dilute hydrochloric acid and water and then extracted with dilute sodium carbonate and water. On acidifying the alkaline extracts 7-hydroxy-1-ethyl-2-carboxy-2-methyl-1,2,3,4-tetrahydrophenanthrene of the formula

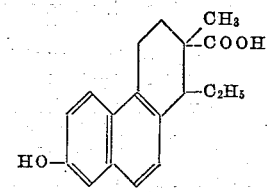

separates out as a slightly coloured crystalline powder. After recrystallizing from dilute methanol it melts at 201–203° C.

Instead of hydrolysis of the carbomethoxy and the methoxy group in 7-methoxy-1-ethyl-2 - carbomethoxy-2-methyl-1,2,3,4-tetrahydrophenanthrene in stages, these two substituents can be eliminated in one reaction. For this purpose the substance is heated with a mixture of potassium hydroxide and absolute alcohol (1:2) for 8 to 10 hours in an iron tube to 200–210° C. After cooling, the contents of the tube are dissolved in water and acidified. In this way the 7 - hydroxy-1-ethyl-2-carboxy-2-methyl-1,2,3,4-tetrahydrophenanthrene described is immediately obtained.

The above synthesis gives an exceptionally good yield if 7-methoxy-1-ethylidene-2-carboethoxy - 2 - methyl - 1,2,3,4 - tetrahydrophenanthrene is saponified by alkaline fusion at 180–200° C. to the free carboxylic acid, this acid in the form of a salt in aqueous solution shaken up in hydrogen in the presence of a nickel catalyst, and the methoxy group split up from the 7-methoxy - 1 - ethyl-2-carboxy-2-methyl-1,2,3,4-tetrahydrophenanthrene by means of, for example, hydrobromic acid.

7 - hydroxy - 1 - ethyl-2-carboxy-2-methyl-1,2,3,4-tetrahydrophenanthrene possesses an exceptionally pronounced estrogenic hormone action. It produces, on peroral administration to castrated rats, full oestrus in doses of 0.15–0.2γ and an action lasting for 9 days with 50γ. It may be esterified in the 7-position, e. g. with propionic acid, stearic acid, benzoic acid or carboxylic acid derivatives, or converted into the corresponding glucosides. Subsequently or previously to this esterification or etherification the carboxyl group in 2-position can moreover be esterified e. g. directly with diazomethane or diazoethane, or also indirectly over a corresponding carboxylic acid alkali salt with a halogenalkyl, such as butylbromide, heptyl-, or benzylchloride. The 7 - hydroxy-1-ethyl-2-carbomethoxy - 2 - methyl-1,2,3,4-tetrahydrophenanthrene melts at 86–88° C. and proves highly active like the unesterified compound. The corresponding 7-benzoyloxy compound melts at 126–128° C., the 7-propionyloxy compound at 88–89° C.

Example 2

1 part of 7-methoxy-1-ethylidene-2-carbomethoxy - 2 - methyl - 1,2,3,4-tetrahydrophenanthrene obtained as an intermediate product as described in Example 1, is heated in a mixture of 10 parts of potassium hydroxide and 20 parts of ethanol in an iron tube to 200–210° C. for 8 to 10 hours. The product of the reaction is dissolved in water and the solution acidified, when 7 - hydroxy - 1-ethylidene-2-carboxy-2-methyl-1,2,3,4-tetrahydrophenanthrene of the formula

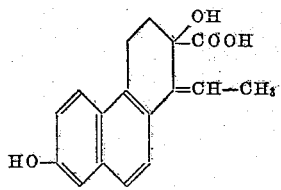

is precipitated out. After recrystallization from dilute alcohol it melts at 176–182° C. with decomposition.

This compound also surprisingly proves to be highly active in the oestrus test on the castrated rat.

By hydrogenation in aqueous, alcoholic, alkaline solution with the help of a nickel catalyst, the compound can be converted into 7-hydroxy-1 - ethyl - 2 - carboxy-2-methyl-1,2,3,4-tetrahydrophenanthrene, described in Example 1.

Example 3

7 - methoxy-1-oxo-2-carbomethoxy-2-methyl-1,2,3,4-tetrahydrophenanthrene is allowed to react with methyl magnesium iodide in a manner analogous to that of Example 1. One part of 7-methoxy - 1-hydroxy - 1,2 - dimethyl-2-carbomethoxy - 1,2,3,4 - tetrahydrophenanthrene is heated in a water-bath for a few minutes with 3 parts of anhydrous formic acid. The mixture is diluted with plenty of ether and the formic acid extracted with sodium carbonate solution. On evaporating down the ether solution 7-methoxy-1 - methylene-2-carbomethoxy-2-methyl-1,2,3,4-tetrahydrophenanthrene remains which, on recrystallization from isopropyl ether, melts at 97–98° C.

This compound can be hydrogenated to 7-methoxy - 1,2 - dimethyl-2-carbomethoxy-1,2,3,4-tetrahydrophenanthrene exactly as described in Example 1 using a palladium-charcoal catalyst. The latter is then converted, by means of potassium fusion into 7-methoxy-1,2-dimethyl-2-carboxy-1,2,3,4-tetrahydrophenanthrene.

One part of the acid named is boiled for 10 hours under reflux in 50 parts of glacial acetic acid and 25 parts of concentrated hydrochloric acid. The solution obtained from the reaction is poured into water and the 7-hydroxy-1,2-dimethyl - 2 - carboxy - 1,2,3,4 - tetrahydrophenanthrene of the formula

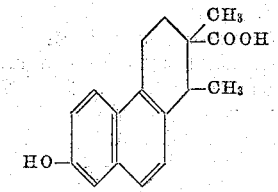

precipitated, filtered off by suction, washed with water and dried. After recrystallization from dilute alcohol this compound melts at 244° C.

Example 4

A mixture of 1.6 parts of magnesium filings and 0.4 part of magnesium-copper alloy filings are activated with iodine and covered with absolute ether. A mixture of 2 parts of allyl bromide and 10 parts of ether is then added, stirring continually and, after the reaction has started, a mixture dropped in consisting of 12 parts allyl bromide, 150 parts of absolute ether and 10 parts of 7-ethoxy-2-oxo-2 - carboethoxy-2-ethyl - 1,2,3,4-tetrahydrophenanthrene. (The latter compound has the formula

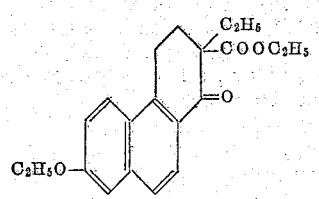

and can be obtained, for example, from 7-ethoxy-1-oxo-2 - carboethoxy - 1,2,3,4 - tetrahydrophenanthrene by ethylation with ethyl iodide and alkali ethylate in benzene solution.) After the reaction is complete, the mixture is boiled for another hour in a water-bath, then decomposed with ice and hydrochloric acid, and completely dissolved by the addition of more ether. The ethereal solution is washed with aqueous hydrochloric acid, sodium carbonate solution and water, dried and evaporated down. 7-ethoxy - 1 - hydroxy-1 - allyl-2-carboethoxy - 2 - ethyl-1,2,3,4-tetrahydrophenanthrene separates out.

1 part of the latter is boiled under reflux for 15 minutes with a solution of 2 parts of phosphorous oxychloride in 60 parts of pyridine, then cooled, poured on to 150 parts of ice, and acidified with concentrated hydrochloric acid. The precipitated product is filtered off by suction, washed with hydrochloric acid, sodium carbonate solution and water, and crystallized from aqueous methanol. 7-ethoxy-1-allylidene-2 - carboethoxy - 2 - ethyl-1,2,3,4-tetrahydrophenanthrene is obtained which can be hydrolysed to 7-hydroxy-1-allylidene-2-carboxy-2-ethyl-1,2,3,4 - tetrahydrophenanthrene of the formula

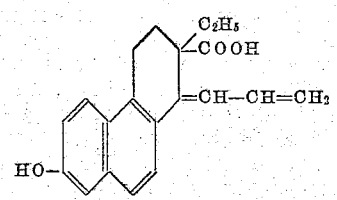

analogous to Example 2.

Example 5

1 part of 7-ethoxy-1-allylidene-2-carboethoxy-2-ethyl-1,2,3,4-tetrahydrophenanthrene, which is obtained as an intermediate product in the synthesis described in Example 4 is hydrogenated in 10 parts of glacial acetic acid using 0.1 part of a 10 percent palladium-charcoal catalyst. In this way 7-ethoxy-1-propyl-2-carboethoxy-2-ethyl-1,2,3,4-tetrahydrophenanthrene is obtained which can be hydrolysed in stages or in one operation as described in Examples 1 and 2 to 7-hydroxy-1-propyl-2-carboxy - 2 - ethyl - 1,2,3,4 - tetrahydrophenanthrene of the formula

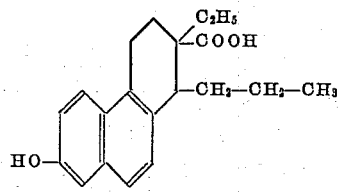

The same compound can, for example, also be obtained by hydrogenation of 7-hydroxy-1-allylidene-2 - carboxy - 2 - ethyl - 1,2,3,4 - tetrahydrophenanthrene using a nickel catalyst as described in Example 2. It can also be obtained, for example, by hydrogenation of 7-ethoxy-1-hydroxy-1-allyl-2-carboethoxy - 2 - ethyl-1,2,3,4 - tetrahydrophenanthrene, subsequent elimination of water, hydrogenation and hydrolysis, whereby the last two reactions can also be carried out in the reverse order. In this case 7-hydroxy-1-propylidene - 2 - carboxy-2-ethyl - 1,2,3,4 - tetrahydrophenanthrene is obtained as intermediate product.

The same final product is also obtained if 7-ethoxy-1-oxo-2 - carboethoxy - 2 - ethyl - 1,2,3,4-tetrahydrophenanthrene is allowed to react with propyl magnesium bromide as described in the above examples.

To obtain aqueous solutions of the oestrogenically active product it is converted, for example, into its alkali, alkaline earth or ammonium salt, e. g. alkyl ammonium or ethanol ammonium salts. Instead of the phenol carboxylic acid itself, its 7-esters of polycarboxylic acids, sulphonic-carboxylic acids or alkylated aminocarboxylic acids may be used to prepare water-soluble salts. Finally certain glycosides are themselves water-soluble.

Example 6

8 parts of 7-methoxy-1-oxo-2-carbomethoxy-2-methyl-1,2,3,4,9,10-hexahydrophenanthrene of the formula

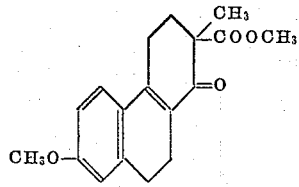

are added all at once to a Grignard solution prepared from 1 part of magnesium in 80 parts of absolute ether and 12 parts of ethyl bromide. The mixture is then heated for some time under reflux, and the product of the reaction decomposed by cooling with ice-cooled ammonium chloride solution. The product obtained is dissolved in plenty of ether, washed with dilute hydrochloric acid and water, and the ethereal solution evaporated down in vacuo. The residue is crude 7- methoxy-1-hydroxy-1-ethyl-2-carbomethoxy-2-methyl-1,2,3,4,9,10-hexahydrophenanthrene.

1 part of this compound is boiled under reflux for three hours with 10 parts of chloroform and 0.1 part of iodine, and then worked up as described in Example 1. The 7-methoxy-1-ethylidene-2-carbomethoxy-2-methyl-1,2,3,4,9,10- hexahydrophenanthrene obtained is hydrogenated catalytically, the hydrogenation coming practically to a standstill after the absorption of 2 mols of hydrogen. The 7-methoxy-1-ethyl-2-carbomethoxy-2-methyl-octahydrophenanthrene obtained is then hydrolysed, for example, by the methods described in Examples 1 and 2, and 7-hydroxy-1-ethyl-2-carboxy-2-methyl - octahydrophenanthrene of the formula

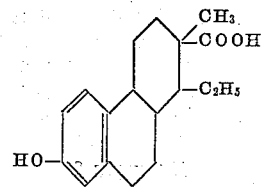

obtained. It melts at 190° C. and produces full oestrus in castrated rats with only 0.3–0.5γ, administered by mouth.

The compound used as starting material can be obtained, for example, from 7-methoxy-1-oxo-1,2,3,4,9,10-hexahydrophenanthrene via the 2-glyoxalate by elimination of carbon-monoxide and methylation in the 2-position.

The same end product is obtained if 7-methoxy-1-oxo-2-carbomethoxy-2-methyl- octahydrophenanthrene or other corresponding, 2-carboxylic acid derivatives, such as the nitrile, are used as starting materials.

The 7-hydroxy-1-ethyl-2-carboxy - 2 - methyl-octahydrophenanthrene can be converted into active esters, for example, the 7-butyrate, 7-palmitate or 7-benzoate. If aqueous solutions or special depot effects are desired, application in the form of salts, e. g. alkali, alkaline earth or ammonium salts is advantageous.

Example 7

7-methoxy-1-oxo-2-carboethoxy-2 - ethyl-1,2,-3,4-tetrahydrophenanthrene is caused to react with ethyl magnesium bromide in a manner similar to that described in Example 1. The carbinol obtained (M. Pt. 128° C.) is converted, on treating with warm formic acid, into 7-methoxy-1-ethylidene-2-carboethoxy-2 - ethyl-1,2,3,4- tetrahydrophenanthrene, melting at 148° C. On saponification by alkali fusion at 180–200° C. the free unsaturated acid (M. Pt. 188° C.) is obtained. This compound can be catalytically hydrogenated to the saturated 7-methoxy-1,2-diethyl-1,2,3,4-tetrahydrophenanthrene-2-carboxylic acid, 1 mol of hydrogen being absorbed. It melts at 174° C. (not sharply) and can be converted by boiling in hydrobromic acid or treatment with alcoholic caustic potash at 210° C. into the 7-hydroxy-1,2-diethyl-2 -carboxy-1,2,3,4-tetrahydrophenanthrene which melts at 188–189° C. and has the formula

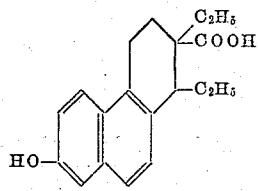

By the methods analogous to those described above the following compounds can be prepared:

7-hydroxy-1-methyl-2-carboxy- 2 - ethyl-1,2,3,4-tetrahydrophenanthrene, 7-hydroxy-1-propyl-2-carboxy - 2 - ethyl-1,2,3,4-tetrahydrophenanthrene,
7-hydroxy-1-propylidene-2-carboxy-2-ethyl-1,2,-3,4-tetrahydrophenanthrene,
7-hydroxy-1-ethyl-2-carboxy-2- propyl - 1,2,3,4,-tetrahydrophenanthrene,
7-hydroxy-1-methyl-2-carboxy-2 -propyl-1,2,3,4-tetrahydrophenanthrene,
7-hydroxy-1-propyl-2-carboxy-2 -propyl-1,2,3,4,-tetrahydrophenanthrene,
7-hydroxy-1-benzyl-2-carboxy-2-methyl-1,2,3,4,-tetrahydrophenanthrene,
7-acetoxy-1-ethyl-2-carboxy - 2 - methyl-1,2,3,4-tetrahydrophenanthrene,
7-propionyl-1-ethyl-2-carboxy-2 -methyl-1,2,3,4-tetrahydrophenanthrene,
7-benzoyloxy-1-ethyl-2-carboxy-2 -methyl - 1,2,-3,4-tetrahydrophenanthrene,
7-propionyloxy- 1-ethyl-2-carboxy-2-ethyl-1,2,3,4,-tetrahydrophenanthrene,
7-benzoyloxy-1-ethyl-2-carboxy-2 -ethyl-1,2,3,4,-tetrahydrophenanthrene,
7-propionyloxy-1-methyl-2-carboxy - 2 - methyl-1,2,3,4-tetrahydrophenanthrene,
7-benzoyloxy-1-methyl-2-carboxy-2-methyl-1,2,-3,4-tetrahydrophenanthrene,
7-hydroxy-1-methyl-2 -carboethoxy - 2 - methyl-1,2,3,4-tetrahydrophenanthrene,
7 - propionyloxy - 1 - methyl - 2 - carboethoxy-2-methyl-1,2,3,4-tetrahydrophenanthrene,
7 -benzoyloxy- 1 -methyl-2-carboethoxy-2-ethyl-1,2,3,4-tetrahydrophenanthrene.

What we claim is:

1. A hydrophenanthrene which is saturated at least in the 1-, 2-, 3-, and 4-positions and which contains, as sole substituents, an alkyl group in each of the 1- and 2-positions, a member selected from the class consisting of the carboxylic acid and carboxylic acid ester groups in the 2-position, and a member selected from the class consisting of phenolic hydroxyl and etherified phenolic hydroxyl in the 7-position.

2. A compound of the formula

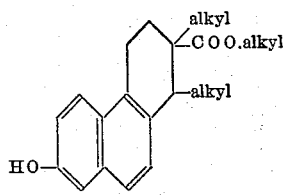

3. A compound of the formula

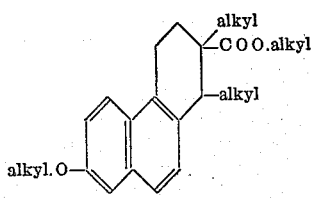

4. A compound of the formula

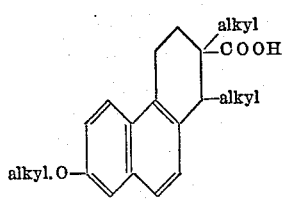

5. The 7-hydroxy-1-ethyl-2-carboxy-2-methyl-1,2,3,4-tetrahydrophenanthrene of the formula

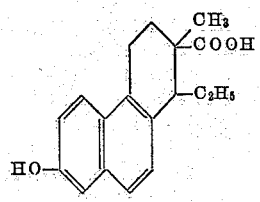

and melting at about 201–203° C.

6. The 7-hydroxy-1-ethyl-2-carbomethoxy-2-methyl-1,2,3,4-tetrahydrophenanthrene of the formula

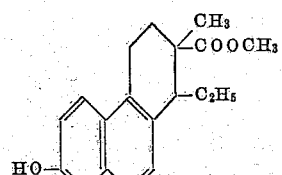

melting at about 86–88° C.

7. The 7-methoxy-1-ethyl-2-carboxy-2-methyl-1,2,3,4-tetrahydrophenanthrene of the formula

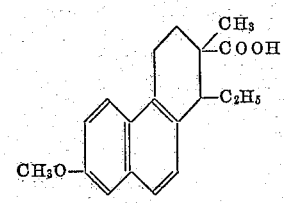

and melting at about 225–228° C.

8. In a process for the manufacture of a hydroxy-hydrophenanthrene-carboxylic acid and derivatives thereof which, upon hydrolysis, are convertible thereinto, the steps of reacting a 1-keto-hydrophenanthrene which (a) is saturated at least in the 1-, 2-, 3- and 4-positions but is unsaturated in the ring containing the 7-position, (b) contains an ester group as one substituent in the 2-position and an alkyl group as another substituent in the 2-position, and (c) contains an etherified phenolic hydroxyl group in the 7-position, with a metallo-hydrocarbon compound and treating the resultant product, with a hydrolizing agent whereby the hydrocarbon group of the said compound is selectively introduced into the aforesaid 1-position.

9. In a process for the manufacture of a hydroxy-hydrophenanthrene-carboxylic acid and derivatives thereof which, upon hydrolysis, are convertible thereinto, the steps of reacting a 1-keto-hydrophenanthrene which (a) is saturated at least in the 1-, 2-, 3- and 4-positions but is unsaturated in the ring containing the 7-position, (b) contains an ester group as one substituent in the 2-position and a methyl group as another substituent in the 2-position, and (c) contains an etherified phenolic hydroxyl group in the 7-position, with an alkyl magnesium halide and treating the resultant product, with a hydrolyzing agent whereby the alkyl group of the said halide is selectively introduced into the aforesaid 1-position.

10. In a process for the manufacture of hydroxy-hydrophenanthrene-carboxylic acid and derivatives thereof which, upon hydrolysis, are convertible thereinto, the steps of reacting a 1-keto-hydrophenanthrene which (a) is saturated at least in the 1-, 2-, 3- and 4-positions but is unsaturated in the ring containing the 7-position, (b) contains an ester group as one substituent in the 2-position and a methyl group as another substituent in the 2-position, and (c) contains an etherified phenolic hydroxyl group in the 7-position, with an ethyl magnesium halide and treating the resultant product with a hydrolyzing agent, whereby the ethyl group of the said halide is selectively introduced into the aforesaid 1-position.

11. In a process for the manufacture of a hydroxy-hydrophenanthrene-carboxylic acid and derivatives thereof which, upon hydrolysis, are convertible thereinto, the steps of reacting a 1-keto-hydrophenanthrene which (a) is saturated at least in the 1-, 2-, 3- and 4-positions but is unsaturated in the ring containing the 7-position, (b) contains an ester group as one substituent in the 2-position and a methyl group as another substituent in the 2-position, and (c) contains an etherified phenolic hydroxyl group in the 7-position, with a metallo-hydrocarbon compound containing an unsaturated hydrocarbon group and treating the resultant product with a hydrolyzing agent, whereby the unsaturated hydrocarbon group of the said compound is selectively introduced into the aforesaid 1-position.

12. In a process for the manufacture of a hydroxy-hydrophenanthrene-carboxylic acid and derivatives thereof which, upon hydrolysis, are convertible thereinto, the steps of reacting a 1-keto-hydrophenanthrene which (a) is saturated at least in the 1-, 2-, 3- and 4-positions but is unsaturated in the ring containing the 7-position, (b) contains an ester group as one substituent in the 2-position and a methyl group as another substituent in the 2-position, and (c) contains an etherified phenolic hydroxyl group in the 7-position, with an acetylenide and treating the resultant product with a hydrolyzing agent, whereby the acetylene group of the said acetylenide is selectively introduced into the aforesaid 1-position.

KARL MIESCHER.
JULES HEER.
JEAN RENÉ BILLETER.

REFERENCES CITED

The following references are of record in the file of this patent:

UNITED STATES PATENTS

| Number | Name | Date |
|---|---|---|
| 1,077,442 | Thron | Nov. 4, 1913 |
| 2,076,098 | Schoeller | Apr. 6, 1937 |
| 2,251,939 | Kathol | Aug. 12, 1941 |
| 2,330,215 | Hildebrandt | Sept. 28, 1943 |
| 2,359,935 | Undenberg | Oct. 10, 1944 |

FOREIGN PATENTS

| Number | Country | Date |
|---|---|---|
| 18,996 | Great Britain | 1912 |
| 468,123 | Great Britain | June 29, 1937 |
| 519,233 | Great Britain | Mar. 20, 1940 |
| 841,080 | France | May 10, 1939 |

OTHER REFERENCES

Maxim: "Compt. Rend.," vol. 182, 1393–1395 (1926).

Cahn: "Jour. Chem. Soc.," (1931), pp. 1121–1123.

Maxim et al.: "Bull. Soc. Chim.," (5), vol. 3, 1936, pp. 1084 to 1093.

Sidgwicks: "Organic Chemistry of Nitrogen," (Taylor, 1937), p. 311.

Karrer: "Organic Chemistry," 1938, pp. 72 and 73.

Cole: "Journal of the American Chemical Society," vol. 62, pp. 824 to 839 (1940).

Bachmann et al.: "Journal of the American Chemical Society," vol. 62 (1940), pp. 2750–2757; ibid., vol. 64, pp. 974 to 981 (1942).

Dane et al.: "Am. der Chemie," vol. 552, pp. 113 to 125 (1942); ibid., vol. 537, pp. 246 to 249.